United States Patent Office 3,391,121
Patented July 2, 1968

3,391,121
COPOLYMERIZATION OF FORMALDEHYDE
WITH ORGANIC NITRILES
Kornel D. Kiss, University Heights, Ohio, assignor
to Diamond Shamrock Corporation, a corporation
of Delaware
No Drawing. Filed Sept. 30, 1964, Ser. No. 400,564
9 Claims. (Cl. 260—67)

ABSTRACT OF THE DISCLOSURE

High molecular weight, thermally stable thermoplastic copolymers are prepared by reacting, under substantially anhydrous conditions and in an inert organic liquid reaction medium, formaldehyde and a nitrile compound which is acetonitrile, trichloroacetonitrile, benzonitrile, para-chlorobenzonitrile, or glutaronitrile. The polymerization catalyst employed is butyl lithium, diethyl zinc, triethyl aluminum, tributyl boron, phenyl magnesium bromide or methyl aluminum dichloride.

---

This invention relates to novel thermoplastic compositions of matter. More particularly, it relates to copolymers structurally related to polyoxymethylene and to the process for preparing these compositions.

It is known to prepare oxymethylene homopolymers by contacting, under substantially anhydrous conditions, formaldehyde, trioxane or other oligomers or formaldehyde with suitable polymerization initiators. These homopolymers which are composed of recurring oxymethylene, —CH$_2$O—, units jointed together in linear chains may vary widely in molecular weight and thermal stability, depending upon the method of preparation. Polyoxymethylenes of higher molecular weight are known to be more stable against thermal degradation than those of lower molecular weight, but even such polymers will be degraded in varying degrees when exposed to elevated processing temperatures. However, when modified by chemical treatment or in admixture with stabilizing additives, these polymers may be processed into a wide variety of useful plastic articles.

We have now found that easily processable polymeric compositions structurally related to polyoxymethylene and possessing similar toughness and strength properties may be prepared by copolymerizing formaldehyde with an organic cyanide compound, or as more commonly designated in the art, a nitrile compound represented by the structural formula

wherein $m$ is 0 to 1, with the proviso that when $m$ is 0, R is selected from the group consisting of alkyl, aryl and aralkyl radicals and halo-substituted derivatives thereof; and when $m$ is 1, R is selected from the group consisting of alkylene and arylene radicals and their halo-substituted derivatives.

More specifically, the present invention involves the preparation of useful, easily workable oxymethylene copolymer compositions which exhibit good thermal stability in processing, which preparation comprises polymerizing under substantially anhydrous conditions and in the presence of a suitable polymerization catalyst or initiator, a monomeric mixture containing from 60 to 99.9 mol percent of formaldehyde with from 0.1 up to 40 mol percent of a nitrile monomer having the aforementioned structure, said process being conducted at a temperature within the range of −80° to +80° C.

The copolymer products obtained are solid, medium to high molecular weight materials which may be fabricated by conventional processing techniques to finished plastic articles, these copolymers exhibiting a substantial degree of thermal stability in processing.

The nitrile monomers which may be copolymerized with formaldehyde to produce the copolymer compositions of this invention are (1) Aliphatic nitriles of saturated monobasic acids containing from 2 to 10 carbon atoms per molecule and nitriles of similar halogenated, particularly chlorinated monobasic acids;
(2) Ring-halogenated and non-halogenated aromatic nitriles; and
(3) Dinitriles obtained from saturated dibasic acids containing from 3 to 10 carbon atoms per molecule, and from their corresponding halogenated derivatives; and
(4) Dinitriles from ring-halogenated an non-halogenated aromatic compounds.

Specific nitrile monomers most advantageously employed in the process of this invention include acetonitrile, trichloroacetonitrile, benzonitrile, p-chlorobenzonitrile and glutaronitrile.

While we do not wish to be bound by any definite theory regarding the manner in which copolymerization is herein accomplished, it is believed that the nitrile monomer may be incorporated into the growing copolymer chain by addition through its nitrile group so that the resulting copolymer product contains recurring oxymethylene, —CH$_2$O—, groups or units interspersed with recurring units derived from the nitrile monomer having the following structure I. 

wherein $m$ is 0 to 1, with the proviso that when $m$ is 0, R is selected from the group consisting of alkyl, aryl and aralkyl radicals and halo-substituted derivatives thereof; and when $m$ is 1, R is selected from the group consisting of alkylene and arylene radicals and their halo-substituted derivatives.

It appears that copolymerzation may be effected primarily in this manner as evidenced by the presence of qualitative infrared spectra of many of the copolymer products of an absorption band characteristic for the imine

group.

It is also possible that in copolymerization reactions employing a dinitrile monomer in combination with formaldehyde, addition of the nitrile may proceed at least partially across both of its nitrile groups, the

linkages of the resulting units derived from the dinitrile thus serving as cross linking agents by being interspersed between recurring oxymethylene units of adjacent copolymer chains as represented by the following structure II. 

wherein R is alkylene or arylene radical or the halo-substituted derivative thereof.

In the copolymer chain, units derived from the nitrile monomer, as previously described, may be interspersed singly between recurring oxymethylene units and may likewise be present therein as comonomer blocks, i.e., segments of the chain comprising at least two of either one or of both of the units represented by structures I and II above which are sequentially joined together with no oxymethylene units between them.

Depending upon the percentage of nitrile monomer present in the copolymer products of this invention, these materials have melting points substantially lower to somewhat lower than that of oxymethylene homopolymers, i.e., these copolymers have melting points within the range of about 135° to 175° C., whereas similarly prepared oxymethylene homopolymers have melting points of 185° to 186° C. The copolymers resemble polyoxymethylene in appearance and generally possess physical properties substantially similar to the homopolymer. However, by comparison to the homopolymer, they exhibit improved processing characteristics and are more thermally stable in processing.

The copolymer products of this invention may contain generally from about 0.1 up to 10 mol percent of nitrile monomer units, as determined by elemental nitrogen analysis of the copolymer. Thus, in the copolymer chain there may be from about 90 up to 99.9 percent of oxymethylene recurring units interspersed with from about 0.1 up to 10 percent of recurring units derived from the nitrile monomer. The preferred copolymers contain from about 0.1 up to 5 percent of the said recurring units derived from the nitrile monomer and from about 95 up to 99.9 percent of recurring oxymethylene units.

The copolymerization reaction is effected in the presence of an ionic-type polymerization catalyst, which is specifically an organometallic compound such as butyl lithium, diethyl zinc, triethyl aluminum, tributyl boron, phenyl magnesium bromide, methyl aluminum dischloride and the like. In practice, the catalyst generally is employed as a solution in a suitable organic solvent and may be used in an amount ranging from 0.01 up to about 25 millimols for each liter of organic liquid reaction medium employed. However, an amount of catalyst within the range of about 0.1 to 10 millimols per liter of reaction medium generally has been found satisfactory and is preferred.

The copolymerization reaction is preferably conducted in an inert, anhydrous, organic liquid which is a solvent for the monomer and for the catalyst and which is a liquid at the reaction temperature. Suitable solvents include aliphatic, cycloaliphatic and aromatic hydrocarbons or their halogenated and nitrated derivatives. Especially preferred for use are aliphatic hydrocarbons containing from 3 to 12 carbon atoms per molecule, e.g., n-heptane, and aromatic hydrocarbons such as toluene. Typically, a ratio of from 1 to 10 parts solvent for each part of formaldehyde is employed in the reaction.

It is essential that the copolymerization process be conducted under anhydrous, or substantially anhydrous conditions. Accordingly, the catalyst solution employed is prepared and then kept prior to use in a nitrogen atmosphere; the liquid reaction medium is dried prior to use and the entire process is carried out under nitrogen.

As stated previously, the reaction generally may be carried out at temperatures within the range of —80° to +80° C. for a time period of from 1 hour to 10 hours. However, the reaction preferably is carried out at a temperature within the range of —70° to +70° C. for a time period of 1 to 5 hours.

Upon completion of the reaction the copolymerization mixture is filtered to recover the product precipitate. Before being dried, the product is typically purified by leaching it well with methanol, aceteone, etc. to remove any unreacted monomers and catalyst residues remaining or to remove any low molecular weight homopolymers which may be present. Additionally, the finished copolymer product may be heated briefly at 130° to 150° C. to decompose any loose unstable chain ends.

The copolymers of this invention possess in many instances a high degree of thermal stability at the required processing temperatures and thus may be processed as prepared without any further stabilizing treatment such as chain end-group "capping," i.e., by chemically converting unstable hydroxyl groups terminating the polymer chains to more stable ether or ester groups, and/or by incorporating stabilizing additives with the copolymers. However, it is to be understood that the copolymers may be so stabilized, if desired, without departing from the intended scope of this invention.

Tough, translucent to opaque thermoplastic articles such as moldings, films, sheets, rods, tubes, fibers, filaments and the like may be prepared from the copolymer products of this invention by conventional molding, casting and/or extrusion processes presently practiced. The fabricated articles exhibit generally the excellent physical and chemical properties which are typical of articles fabricated from oxymethylene homopolymers. The copolymers may be used unmodified in processing or, if desired, may have incorporated therewith additives such as antioxidants, fillers, pigments, stabilizers, processing aids and the like which are oftentimes employed when processing thermoplastic materials.

In order that those skilled in the art may more completely understand the present invention and the preferred methods by which the same may be carried into effect, the following specific examples are offered.

EXAMPLE 1

A one-liter, four-necked polymerization flask is fitted with a agitator, a thermometer, a reflux condenser, a rubber serum cap for catalyst injection and with inlet and outlet tubes for passage of nitrogen and for the introduction of formaldehyde vapors to the flask. An electrically heated flask from which formaldehyde is supplied to the polymerizer is fitted with a thermometer and with gas inlet and outlet tubes and is connected by cold traps to the polymerization flask. Five-hundred ml. of anhydrous n-heptane is charged to the polymerizer, 85 g. of trioxymethylene (reagent grade) is placed in the pyrolyzer and agitation is started. The polymerization system is then purged with nitrogen after which 50 ml. of acetonitrile is injected into the polymerizer and the polymerizer and its contents are cooled to —70° C. While a slight positive nitrogen pressure is maintained on the polymerization system, 2 ml. of a one-molar solution of butyl lithium catalyst in n-heptane is injected and formaldehyde vapors are initially introduced into the polymerizer. After the introduction of formaldehyde, the reaction mixture is maintained at —70° to —71° C. for four hours. The reaction mixture is then allowed to warm to room temperature, is discharged from the polymerizer and is filtered to isolate the product precipitate. The separated product is washed well with methanol and is dried at 40° C. under vacuum. There is recovered 23 g. of white, fibrous polymeric product which contains 1.02 mol percent of units derived from acetonitrile, as determined by elemental nitrogen analysis. Using a Fisher-Johns melting point apparatus, this copolymer is observed to melt at 172° C. With continued heating, it exhibits substantial stability to at least 190° C. A 1-gram portion of the copolymer is placed between ferro-type plates and pressed at a temperature of 175° C. and under a pressure of 10,000 p.s.i. for 1 minute. The tough film product obtained, which is opaque in appearance, is extremely flexible and can be folded repeatedly without breaking. Another portion of the copolymer is placed in a 2 x 4-inch closed mold. The mold is placed in a Pasadena press and is heated for 3 minutes at 180° C. under a pressure of 20,000 p.s.i. The extremely tough, fairly rigid molding produced is white and opaque in appearance and shows no evidence of any thermal degradation.

EXAMPLE 2

Using the polymerization equipment and following the general procedure as outlined in Example 1, a formaldehyde-acetonitrile copolymer is prepared employing 500 ml. of n-heptane, 85 g. of trioxymethylene, 5 ml. of acetonitrile and 2 ml. of the one-molar solution of butyl lithium in n-heptane. In this example, after adding the acetonitrile to the polymerizer the flask and its contents are cooled to −33° C., at which temperature the catalyst is injected into the polymerizer and formaldehyde vapors are initially introduced. After the introduction of formaldehyde, the reaction is continued for 4¾ hours, during which time the mixture warms to 36° C. and is then warmed further by gentle heating to a final temperature of 60° C. The product is isolated, purified and dried as described in Example 1. The white, granular product recovered (23.5 g.) contains 1.8 mol percent of acetonitrile units. A qualitative infrared spectrum of this copolymer shows the presence of a band characteristic for the

grouping. The copolymer has a melting point of 160° C. It is molded at a temperature of 170° C. under conditions as described in Example 1 to produce tough, opaque specimen moldings. Portions of the copolymer are pressed between ferro-type plates at a temperature of 175° C. and under a pressure of 10,000 p.s.i. The opaque films obtained are tough and leather-like. Extremely flexible, they can be folded repeatedly without breaking.

EXAMPLE 3

Using the same polymerization apparatus and the same general procedure as previously described, a formaldehyde-trichloroacetonitrile copolymer is prepared. In this example, the reaction ingredients are 500 ml. of anhydrous toluene, 85 g. of trioxymethylene, 2 ml. of a one-molar solution of butyl lithium catalyst and 2 ml. of trichloroacetonitrile. After adding the trichloroacetonitrile to the toluene at room temperature, the polymerizer and its contents are cooled to −70° C. The catalyst is then injected and formaldehyde vapors are initially introduced into the polymerizer. The reaction is then continued for 3½ hours, warming in this time period to a final temperature of +70° C. The polymeric product recovered (67 g). contains 0.3 mol percent of units derived from trichloroacetonitrile, as determined by elemental nitrogen analysis. This copolymer softens at 150° C., melts at 156° C. and, with continued heating, exhibits good thermal stability to at least 210° C. When molded at 160° C. under conditions as described in Example 1, rigid, opaque specimen moldings are produced which are off-white to tan in color. Tough and flexible film products are prepared, as previously described.

EXAMPLE 4

A formaldehyde-benzonitrile copolymer is prepared as previously described, employing with the n-heptane, trioxymethylene and butyl lithium catalyst ingredients as outlined in Example 1, 5 ml. of benzonitrile. In this example, the n-heptane–benzonitrile mixture is cooled to −73° C. prior to introducing the catalyst and formaldehyde vapors into the polymerizer. Thereafter, the reaction is continued for 5 hours, the reaction mixture warming in this time period to a final temperature of +60° C. There is recovered 28.5 g. of a white polymeric material of low bulk density which contains 0.67 mol percent of benzonitrile units. This copolymer begins to soften at 160° C., melts at 170° to 175° C. and, with continued heating, exhibits substantial thermal stability to at least 230° C. Opaque, smooth and rigid moldings are prepared when this copolymer product is molded for 1 minute at 175° C. under a pressure of 4000 p.s.i. Films are likewise prepared from the copolymer as previously described.

EXAMPLE 5

A copolymer is prepared, as previously described, employing in combination with formaldehyde, 2 g. of p-chlorobenzonitrile. Likewise used in this example are 500 ml. of toluene as the liquid reaction medium and 2 ml. of a one-molar solution of butyl lithium catalyst in n-heptane. After charging the toluene and trioxymethylene ingredients at room temperature, the p-chlorobenzonitrile is injected into the polymerizer and the system is purged with nitrogen. The p-chlorobenzonitrile-toluene solution is then cooled to −70° C., while continuing to maintain a slight positive nitrogen pressure on the system. At this temperature, the catalyst and formaldehyde vapors are introduced into the polymerizer, after which the reaction is continued for 1 hour at −70° C. The polymeric product recovered melts at approximately 135° C. and contains 0.96 mol percent of units derived from p-chlorobenzonitrile. With continued heating, this copolymer exhibits thermal stability up to 230° C. It can be molded at 145° to 150° C. as previously described to prepare opaque, tough and fairly flexible specimen moldings.

EXAMPLE 6

As described in the previous examples, a copolymer product of this invention is prepared, employing 500 ml. of n-heptane, 85 g. of trioxymethylene, 2 ml. of the one-molar solution of butyl lithium and as the nitrile comonomer, 5 ml. of glutaronitrile. In this example, the reaction is carried out for 2½ hours, after the catalyst and formaldehyde have been introduced. The reaction temperature is −70° C. The polymeric product recovered (59.7 g.) is a white powder. Upon analysis, this product is found to contain 1.2 mol percent of glutaronitrile units. It has a melting point of 160° C. and remains stable when heated to at least 180° C. Translucent, smooth specimen moldings of good toughness and strength properties are prepared by molding this copolymer product at 170° C. under conditions as previously described. Translucent, tough films are prepared by pressing these moldings at 175° C. and under a pressure of 10,000 p.s.i.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for preparing a copolymer composition exhibiting good thermal stability at processing temperatures, which process comprises copolymerizing in an inert liquid aliphatic, cycloaliphatic or aromatic hydrocarbon medium under substantially anhydrous conditions, at a temperature ranging from −80° to +80° C. and for a time period of 1 hour to 10 hours, a major amount of formaldehyde and a minor amount of a nitrile monomer having the structure

wherein $m$ is 0 to 1, with the proviso that when $m$ is 0, R is selected from the group consisting of alkyl, aryl, aralkyl, chloroalkyl and chloroaryl radicals; and when $m$ is 1, R is selected from alkylene, arylene, chloroalkylene and chloroarylene radicals; the said formaldehyde and nitrile monomer being reacted in the presence of from 0.01 to 25 millimols per liter of said liquid hydrocarbon medium of a polymerization catalyst which is butyl lithium, diethyl zinc, triethyl aluminum, tributyl boron, phenyl magnesium bromide or methyl aluminum dichloride; and recovering a solid copolymer consisting essentially of from 90 up to 99.9 percent of recurring oxymethylene units interspersed with from 0.1 up to about 10 percent of recurring units derived from the said nitrile.

2. The process of claim 1 in which the catalyst is butyl lithium.

3. The process of claim 1 in which the reaction is conducted at a temperature ranging from −75° C. to +70° C. for a time period of 1 to 5 hours.

4. The process of claim 1 in which the liquid hydrocarbon medium is an aliphatic hydrocarbon containing from 3 to 12 carbon atoms per molecule or toluene.

5. The process of claim 1 in which the nitrile monomer employed is acetonitrile.

6. The process of claim 1 in which the nitrile monomer employed is trichloroacetonitrile.

7. The process of claim 1 in which the nitrile monomer employed is benzonitrile.

8. The process of claim 1 in which the nitrile monomer employed is p-chlorobenzonitrile.

9. The process of claim 1 in which the nitrile monomer employed is glutaronitrile.

References Cited

UNITED STATES PATENTS

| | | | |
|---|---|---|---|
| 2,239,441 | 4/1941 | D'Alelio | 260—78.4 |
| 2,478,990 | 8/1949 | Walker | 260—88.7 |
| 2,511,653 | 6/1950 | Shand | 260—465.6 |
| 2,953,599 | 9/1960 | Welcher | 260—72 |
| 3,272,780 | 9/1966 | Wilson et al. | 260—67 |

OTHER REFERENCES

Magat et al.: Journal American Chemical Society, 73 (1951).

Mark: Journal Polymer Science, Part A, vol. 1, No. 11 (1963).

WILLIAM H. SHORT, *Primary Examiner.*

L. M. PHYNES, *Assistant Examiner.*